(12) United States Patent
Kathan et al.

(10) Patent No.: US 9,155,982 B2
(45) Date of Patent: Oct. 13, 2015

(54) POSS-MODIFIED SUPPORT ELEMENT

(71) Applicant: Pall Corporation, Port Washington, NY (US)

(72) Inventors: Kyle R. Kathan, Land O'Lakes, FL (US); Jonathan A. Liddy, New Port Richey, FL (US); Michael J. Adams, Trinity, FL (US)

(73) Assignee: Pall Corporation, Port Washington, NY (US)

( * ) Notice: Subject to any disclaimer, the term of this patent is extended or adjusted under 35 U.S.C. 154(b) by 0 days.

(21) Appl. No.: 13/891,300

(22) Filed: May 10, 2013

(65) Prior Publication Data

US 2014/0332461 A1  Nov. 13, 2014

(51) Int. Cl.
*B01D 39/08* (2006.01)
*B01D 29/00* (2006.01)
*B01D 63/10* (2006.01)
*B29C 47/00* (2006.01)

(52) U.S. Cl.
CPC .......... *B01D 29/0002* (2013.01); *B01D 39/083* (2013.01); *B01D 63/10* (2013.01); *B29C 47/0014* (2013.01); *B01D 2239/0654* (2013.01)

(58) Field of Classification Search
CPC .... C08K 5/549; C08K 5/1575; C08K 5/5419; C08K 7/00; C08K 2201/011; C08L 83/00; C08L 83/04; B01D 69/12; B01D 69/125; B01D 69/141; B01D 71/70; B01D 71/82; B01D 2321/168; B01D 2323/38; B82Y 30/00
USPC .................. 210/500.27, 500.35, 490, 500.25; 427/515; 428/221, 323, 331, 357, 364, 428/365; 442/164, 170, 59, 63; 525/101, 525/106, 431, 446, 464, 484, 54.2; 521/134, 27
See application file for complete search history.

(56) References Cited

U.S. PATENT DOCUMENTS

| | | | |
|---|---|---|---|
| 4,612,237 A | 9/1986 | Frankenburg | |
| 5,855,783 A * | 1/1999 | Shucosky et al. | 210/493.1 |
| 6,692,555 B2 * | 2/2004 | Oda et al. | 434/113 |
| 6,933,345 B1 | 8/2005 | Lichtenhan et al. | |
| 7,405,251 B2 * | 7/2008 | Romenesko et al. | 524/161 |
| 7,790,841 B1 | 9/2010 | Yandek et al. | |
| 7,879,123 B2 | 2/2011 | Lundquist et al. | |
| 7,897,667 B2 | 3/2011 | Mabry et al. | |
| 2003/0209480 A1 * | 11/2003 | Kneifel et al. | 210/321.8 |
| 2004/0060867 A1 * | 4/2004 | Kriksunov et al. | 210/650 |
| 2009/0001219 A1 | 1/2009 | Golecki et al. | |
| 2010/0249257 A1 | 9/2010 | Jana et al. | |
| 2010/0323573 A1 | 12/2010 | Chu et al. | |
| 2011/0120940 A1 | 5/2011 | Allen et al. | |
| 2011/0127212 A1 * | 6/2011 | Ishizuka et al. | 210/493.5 |
| 2012/0227468 A1 | 9/2012 | Doi et al. | |
| 2014/0343215 A1 * | 11/2014 | Ouchiyama et al. | 524/500 |

FOREIGN PATENT DOCUMENTS

| | | | | |
|---|---|---|---|---|
| CN | 200910228477 A | * | 6/2010 | ............ D06M 10/02 |
| EP | 2 434 055 A1 | | 3/2013 | |
| JP | 63-312137 A2 | | 12/1988 | |
| JP | 05-269944 A2 | | 10/1993 | |
| JP | 10-174822 A2 | | 6/1998 | |
| JP | 10174822 A | * | 6/1998 | |
| JP | 11-350293 A2 | | 12/1999 | |
| JP | 2004-107511 A2 | | 4/2004 | |
| JP | 2005-288368 A2 | | 10/2005 | |
| JP | 2011-104471 A2 | | 6/2011 | |

OTHER PUBLICATIONS

William H. Revoir, Respiratory Protection Handbook 56 (1997).*

* cited by examiner

*Primary Examiner* — Krishnan S Menon
*Assistant Examiner* — Brad Gordon, II
(74) *Attorney, Agent, or Firm* — Leydig, Voit & Mayer

(57) ABSTRACT

A support element, comprising a netting comprising a composition comprising a polyphenylene sulfide resin and at least one polyhedral oligimeric silsequioxane additive, is provided.

11 Claims, No Drawings

POSS-MODIFIED SUPPORT ELEMENT

BACKGROUND OF THE INVENTION

Filters are used for a variety of applications. Many filters include both a porous filter element and at least one additional element in the form of a mesh or screen (also called netting). The additional element, which has much larger openings than the pores of the filter element, can provide support to the filter element and/or provide good drainage for the filter element (e.g., the additional element can have low edgewise flow resistance such that the pressure drop in the additional element is less than the pressure drop across the filter element, thereby providing an even distribution of fluid across the surface of the filter element). While filter elements can be pleated to increase area in a given volume, since the dirt capacity of some pleated filter elements is less than the flat sheet dirt capacity due to pleat collapse under differential pressure, it may be desirable to utilize a mesh or screen to support the pleated filter element.

However, there is a need for improved support elements.

The present invention provides for ameliorating at least some of the disadvantages of the prior art. These and other advantages of the present invention will be apparent from the description as set forth below.

BRIEF SUMMARY OF THE INVENTION

An embodiment of the invention provides a support element comprising a netting comprising a composition comprising a polyphenylene sulfide (PPS) resin, and at least one polyhedral oligimeric silsesquioxane (POSS) additive. In a preferred embodiment, the POSS comprises phenyl R-groups.

In another embodiment, a filter is provided, the filter comprising a filter element comprising a porous medium, and the support element.

DETAILED DESCRIPTION OF THE INVENTION

In accordance with an embodiment of the present invention, a support element is provided, the support element comprising a netting comprising a composition comprising a polyphenylene sulfide (PPS) resin, and at least one polyhedral oligimeric silsesquioxane (POSS) additive. In a preferred embodiment, the POSS comprises phenyl R-groups.

In another embodiment, a filter is provided, the filter comprising a filter element comprising a porous medium, and the support element. In a preferred embodiment, the filter comprises a pleated filter.

Preferably, the support element is used with at least one filter element, more preferably, a pleated filter element, e.g., to provide a filter. The support element and filter element can be separate elements, or can be combined, e.g., as a composite. In some embodiments, a filter can comprise more than one support element and/or more than one filter element. For example, a filter can comprise an upstream support element and a downstream support element, with a filter element interposed between the upstream support element and the downstream support element.

As used herein, a "support element" provides support, and in some applications, also provides one or more of any of the following functions: prefiltration, drainage, spacing and cushioning. As used herein, the term "mesh" also encompasses "screen" and "netting."

Advantageously, support elements according to the invention are stiffer and more resistant to deformation under differential pressure than conventional support elements. When the support elements according to the invention are used with filter elements, particularly pleated filter elements, the dirt capacity of the filter elements are improved. More advantageously, higher performance of a filter element can be achieved using a smaller envelope (e.g., the inventive support element can be thinner than conventional support elements). Additionally, or alternatively, the inventive support element can be more suitable for sterilization (e.g., by autoclave radiation) than conventional support elements.

In accordance with the invention, polyphenylene sulfide (PPS) resins (from which the support elements are made) are engineered to enhance crystallization rate and crystallinity during manufacture of the support element, wherein the composition comprising the resin also includes polyhedral oligomeric silsesquioxane (POSS) additives that act as nucleating agents, resulting in large numbers of crystallites forming rapidly, providing lower crystallite size and higher volume fraction of crystallized resin.

Each of the components of the invention will now be described in more detail below.

PPS resins are based on an organic polymer consisting of aromatic rings linked with sulfides, and PPS resin can be molded, extruded, or machined. A variety of suitable resins and grades of resins for use in the compositions are known in the art, and are commercially available, e.g., under the tradenames FORTRON (Ticona Engineering Polymers, Florence, Ky.), XYRON (Asahi Kasei Plastics, North America, Inc., Fowlerville, Mich.), RYTON (Chevron Phillips Chemical Co., The Woodlands, Tex.), and TECHTRON.

In accordance with embodiments of the present invention, the PPS may be present in the composition in any effective amount, typically, in an amount of in the range of from about 95% to about 99.5% by weight of the composition.

The composition also includes at least one polyhedral oligomeric silsesquioxane (POSS) additive, which is a nanostructured chemical additive. Polyhedral oligomeric silsesquioxane molecules suitable for use in accordance with embodiments of the invention include those manufactured by, for example, Hybrid Plastics Inc. (Hattiesburg, Miss.) and are commercially available under the tradename POSS®. They are described in, for example, U.S. Pat. Nos. 6,972,312 and 6,770,724.

POSS® nanostructure compositions are represented by the formula:

$[(RSiO_{1.5})_n]_{\Sigma\#}$ for homoleptic compositions $[(RSiO_{1.5})_m(R'SiO_{1.5})_n]_{\Sigma\#}$ for heteroleptic compositions $[(RSiO_{1.5})_m(RXSiO_{1.0})_n]_{\Sigma\#}$ for functionalized heteroleptic compositions $[(RSiO_{1.5})_m(R'SiO_{1.5})_n(RXSiO_{1.0})_p]_{\Sigma\#}$ for functionalized heteroleptic compositions $[(XSiO_{1.5})_n]_{\Sigma\#}$ for homoleptic silicate compositions.

In all of the above R=organic substituent (H, cyclic or linear aliphatic or aromatic groups that may additionally contain reactive functionalities such as alcohols, esters, amines, ketones, olefins, ethers, or halides) and X includes but is not limited to OH, Cl, Br, I, alkoxide (OR), ester (O(CO)R), peroxide (OOR), amine ($NR_2$), isocyanate (NCO), and R. Homoleptic systems contain only one type of R group while heteroleptic systems contain more than one type of R group. The symbols m, n and p refer to the stoichiometry of the composition. The symbol $\Sigma$ indicates that the composition forms a nanostructure, and the symbol # refers to the number of silicon atoms contained within the nanostructure. The value for # is the sum of the lettered substituents in a compound, e.g. m+n or m+n+p. It should be noted that $\Sigma\#$ is not to be confused as a multiplier for determining stoichiometry, as it merely describes the overall nanostructural characteristics of the POSS® system (sometimes referred to as the "cage size").

Any effective POSS additives or combination of POSS additives may be used in the support elements of the invention. One of skill in the art will be able to select a POSS additive with substituents tailored to provide a desired effect. In some embodiments, the POSS comprises phenyl R-groups. Illustrative examples of particular POSS molecules effective in embodiments of the invention are OctaIsobutyl-POSS® and TriSilanolIsobutyl POSS®. Other suitable POSS® additives may be chosen to select for desirable properties of the finished product. Such POSS additives include but are not limited to DodecaPhenyl POSS®; Isooctyl POSS®; Phenyl-Isobutyl POSS®; PhenylIsooctyl POSS®; IsooctylPhenyl POSS®; IsobutylPhenyl POSS®; OctaIsobutyl POSS; OctaMethyl POSS®; OctaPhenyl POSS®; OctaTMA POSS®; OctaTrimethylsiloxy POSS®; Norbornenylethyl-Ethyl POSS®; AllylIsobutyl POSS®; MonoVinylIsobutyl POSS®; OctaVinyl POSS®; OctaVinyldimethylsilyl POSS®; DiSilanolIsobutyl POSS®; TriSilanolIsooctyl POSS®; TriSilanolPhenyl POSS®; and TetraSilanolPhenyl POSS®. In some embodiments, a partially condensed silanol POSS®, e.g., TriSilanolPhenyl POSS®, and TriSilanolIsobutyl POSS®, is preferred.

In accordance with embodiments of the present invention, POSS additive may be present in the composition in any effective amount, for example, in an amount of in the range of from about 0.05% to about 5% by weight, typically in the range of from about 0.1% to about 1% by weight.

Advantageously, it has been found that the use of POSS additives improves strength and drainage of the support element, while being compatible with resin extrusion processes. Preferably, the use of POSS with the resin allows extrusion without the use of a separate die lubricant (e.g., POSS act as a lubricant in addition to providing crystal nucleation sites).

While not required, an antioxidant, e.g., a process antioxidant, may be used in an embodiment of the composition to, for example, prevent chain scission and/or prevent free radical depolymerization. Suitable antioxidants include, for example, those sold under the tradenames ETHAPHOS (Albemarle Corporation, Baton Rouge, La.) (e.g., ETHAPHOS 368), ALKANOX (Cherntura Corporation, Philadelphia, Pa.) (e.g. ALKANOX 240), BENEFOS (Mayzo, Inc., Suwanee, Ga.) (e.g., BENEFOS 1680), and IRGANOX (Ciba Corporation; Ciba Specialty Chemicals, Tarrytown, N.Y.) (e.g., IRGAFOS 168). In some embodiments of the present invention, the composition lacks an antioxidant, in those embodiments of the invention including an antioxidant, the antioxidant may be present in the composition in an amount of about 1% or less by weight.

Embodiments of the invention can comprise PPS and POSS additive, or consist essentially of, or consist of, PPS and POSS additive. As noted above, the embodiments of the invention can optionally include an antioxidant, and thus, embodiments of the invention can comprise PPS, POSS additive, and an antioxidant, or consist essentially of, or consist of, PPS, POSS additive, and an antioxidant.

The compositions can be prepared as is known in the art, e.g., via masterbatch or the materials can be mixed and pelletized into a compounded resin and subsequently extruded into the netting.

In accordance with embodiments of the invention, the support element can have a variety of configurations, including planar, pleated, and hollow cylindrical.

In a preferred embodiment of the invention, a filter is provided, comprising a filter element comprising a porous medium, and a embodiment of the support element. A variety of filter elements and porous media are suitable for use in the invention, including fibrous media and membranes. In one preferred embodiment, the filter comprises a pleated filter.

The support element, typically in combination with a filter element (the combination providing a filter), is typically disposed in a housing comprising at least one inlet and at least one outlet and defining at least one fluid flow path between the inlet and the outlet, wherein the support is across the fluid flow path, to provide a filter device. In some embodiments, the filter device is sterilizable. Any housing of suitable shape and providing at least one inlet and at least one outlet may be employed.

The following examples further illustrate the invention but, of course, should not be construed as in any way limiting its scope.

Example 1

This example demonstrates the preparation of a support element according to an embodiment of the invention.

Extrusion Grade polyphenylene sulfide resin (PPS) (FORTRON 1200L; Ticona Engineering Polymers, Florence, Ky.), is mixed with TriSilanolPhenyl POSS® (Part Number SO1458; Hybrid Plastics, Inc., Hattiesburg, Miss.), and Ethaphos 368 (Tris(2,4-di-t-butylphenyl)phosphate; Albermarle Corporation, Baton Rouge, La.). The percentages by weight are as follows: 93% PPS, 3.5% TriSilanolPhenyl POSS, 3.5% Ethaphos 368.

The PPS is fed to a hopper in an extruder. The Ethaphos 368 and POSS are mixed together (separately from the PPS) and also fed into the hopper. The mixture is extruded and pelletized to make a masterbatch additive compound. This additive is added to the carrier polymer PPS and mixed thoroughly with the final composition comprising 20% masterbatch additive and 80% Neat PPS. The material is added to the hopper of an extruder and then extruded into netting. The final composition of the netting is 98.6% PPS, 0.7% POSS, and 0.7% Ethaphos 368.

Example 2

This example demonstrates the preparation of a support element according to another embodiment of the invention.

Extrusion Grade PPS (FORTRON 1200L; Ticona Engineering Polymers, Florence, Ky.), is mixed with TriSilanolPhenyl POSS® (Part Number SO1458; Hybrid Plastics, Inc., Hattiesburg, Miss.), and Ethaphos 368 (Tris(2,4-di-t-butylphenyl)phosphate; Albemarle Corporation, Baton Rouge, La.). The percentages by weight are as follows: 94% PPS, 2.5% TriSilanolPhenyl POSS, 3.5% Ethaphos 368.

The PPS is fed to a hopper in an extruder. The Ethaphos 368 and POSS are mixed together (separately from the PPS) and also fed into the hopper. The mixture is extruded and pelletized to make a masterbatch additive compound. This additive is added to the carrier polymer PPS and mixed thoroughly with the final composition comprising 20% masterbatch additive and 80% Neat PPS. The material is added to the hopper of an extruder and then extruded into netting. The final composition of the netting is 98.8% PPS, 0.5% POSS, and 0.7% Ethaphos 368.

Example 3

This example demonstrates the preparation of a support element according to another embodiment of the invention.

Extrusion Grade PPS (FORTRON 1200L; Ticona Engineering Polymers, Florence, Ky.), is mixed with TriSilanolPhenyl POSS® (Part Number SO1458; Hybrid Plastics, Inc., Hattiesburg, Miss.), and Ethaphos 368 (Tris(2,4-di-t-butylphenyl)phosphate; Albemarle Corporation, Baton Rouge, La.). The percentages by weight are as follows: 95.5% PPS, 1.0% TriSilanolPhenyl POSS, 3.5% Ethaphos 368.

The PPS is fed to a hopper in an extruder. The Ethaphos 368 and POSS are mixed together (separately from the PPS) and also fed into the hopper. The mixture is extruded and pelletized to make a masterbatch additive compound. This additive is added to the carrier polymer PPS and mixed thoroughly with the final composition comprising 20% masterbatch additive and 80% Neat PPS. The material is then added to the hopper of an extruder and extruded into netting. The final composition of the netting is 99.1% PPS, 0.2% POSS, and 0.7% Ethaphos 368.

Example 4

This example demonstrates the preparation of a support element according to another embodiment of the invention.

Extrusion Grade PPS (FORTRON SKX 433C; Ticona Engineering Polymers, Florence, Ky.) is mixed with TriSilanolPhenyl POSS® (Part Number SO1458; Hybrid Plastics, Inc., Hattiesburg, Miss.), and Ethaphos 368 (Tris(2,4-di-t-butylphenyl)phosphate; Albermarle Corporation, Baton Rouge, La.). The percentages by weight are as follows: 94% PPS, 2.5% TriSilanolPhenyl POSS, 3.5% Ethaphos 368.

The PPS is fed to a hopper in an extruder. The Ethaphos 368 and POSS are mixed together (separately from the PPS) and also fed into the hopper. The mixture is then extruded and pelletized to make a masterbatch additive compound. This additive is added to the carrier polymer PPS and mixed thoroughly with the final composition comprising 20% masterbatch additive and 80% Neat PPS. The material is then added to the hopper of an extruder and then extruded into netting. The final composition of the netting is 98.8% PPS, 0.5% POSS, and 0.7% Ethaphos 368.

Example 5

This example demonstrates the preparation of a support element according to another embodiment of the invention.

Extrusion Grade PPS (FORTRON SKX 433C; Ticona Engineering Polymers, Florence, Ky.), is mixed with TriSilanolPhenyl POSS® (Part Number SO1458; Hybrid Plastics, Inc., Hattiesburg, Miss.), and Ethaphos 368 (Tris(2,4-di-t-butylphenyl)phosphate; Albermarle Corporation, Baton Rouge, La.). The percentages by weight are as follows: 95.5% PPS, 1.0% TriSilanolPhenyl POSS, 3.5% Ethaphos 368.

The PPS is fed to a hopper in an extruder. The Ethaphos 368 and POSS are mixed together (separately from the PPS) and also fed into the hopper. The mixture is extruded and pelletized to make a masterbatch additive compound. This additive is added to the carrier polymer PPS and mixed thoroughly with the final composition comprising 20% masterbatch additive and 80% Neat PPS. The material is added to the hopper of an extruder and then extruded into netting. The final composition of the netting is 99.1% PPS, 0.2% POSS, and 0.7% Ethaphos 368.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A support element comprising
a netting comprising a composition comprising a polyphenylene sulfide resin, at least one polyhedral oligimeric silsesquioxane (POSS) additive in an amount in the range from about 0.1% to about 5% POSS by weight, and at least one antioxidant in an amount in the range of from about 0.7% to about 1% by weight.

2. The support element of claim 1, wherein the composition comprises at least about 0.1% POSS to about 1% POSS by weight.

3. The support element of claim 1, wherein the POSS comprises phenyl R-groups.

4. A filter comprising a filter element comprising a porous medium, and the support element of claim 1.

5. The filter of claim 4, comprising a pleated filter.

6. The filter of claim 4, wherein the filter element comprises a fibrous medium.

7. The support element of claim 2, wherein the POSS comprises phenyl R-groups.

8. A filter comprising a filter element comprising a porous medium, and the support element of claim 2.

9. A filter comprising a filter element comprising a porous medium, and the support element of claim 3.

10. A filter comprising a filter element comprising a porous medium, and the support element of claim 7.

11. The filter of claim 5, wherein the filter element comprises a fibrous medium.

\* \* \* \* \*